United States Patent
Dorogusker et al.

(10) Patent No.: US 10,210,566 B1
(45) Date of Patent: Feb. 19, 2019

(54) ONLINE EXCHANGE FOR PAYMENT TRANSACTION AUCTIONS

(71) Applicant: Square, Inc., San Francisco, CA (US)

(72) Inventors: Jesse Dorogusker, Palo Alto, CA (US); Erik Bourget, San Francisco, CA (US); Hunter Francoeur, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 918 days.

(21) Appl. No.: 14/184,590

(22) Filed: Feb. 19, 2014

(51) Int. Cl.
  *G06Q 30/00* (2012.01)
  *G06Q 30/08* (2012.01)
  *G06Q 20/10* (2012.01)
  *G06Q 20/12* (2012.01)

(52) U.S. Cl.
  CPC .......... *G06Q 30/08* (2013.01); *G06Q 20/102* (2013.01); *G06Q 20/12* (2013.01)

(58) Field of Classification Search
  CPC ...... G06Q 20/10; G06Q 20/20; G06Q 20/027; G06Q 40/02; G06Q 20/085; G06Q 20/0855
  See application file for complete search history.

(56) References Cited

U.S. PATENT DOCUMENTS

| | | | | |
|---|---|---|---|---|
| 6,999,943 B1* | 2/2006 | Johnson | ................ | G06Q 20/10 705/35 |
| 2002/0095303 A1* | 7/2002 | Asayama | ............... | G06Q 20/04 705/26.1 |
| 2007/0090183 A1* | 4/2007 | Hursta | ................ | G06Q 20/027 235/380 |
| 2008/0040261 A1* | 2/2008 | Nix | ........................ | G06Q 20/04 705/39 |
| 2014/0372234 A1* | 12/2014 | Tikku | .................. | G06Q 20/027 705/21 |

* cited by examiner

*Primary Examiner* — Christopher Stanford
(74) *Attorney, Agent, or Firm* — Lee & Hayes, PC

(57) ABSTRACT

Disclosed are method and apparatus that host auctions for completing payment transactions that benefit a party of the transactions. The technique transmits bidding invitations for completing a payment transaction to multiple payment processors. Among the received auction bids, the technique selects a winning bid from an individual payment processor that offers a best benefit to a party involved in the payment transaction (e.g., a consumer or a merchant). Through the auction process, the technique enables a cost-effective routing for completing the payment transaction.

30 Claims, 10 Drawing Sheets

ONLINE EXCHANGE FOR PAYMENT TRANSACTION AUCTIONS

BACKGROUND

The traditional manner of paying a merchant using a payment account (e.g., a credit card) is inefficient and costly to both merchants and consumers. For instance, when a consumer wishes to pay for an item at a merchant's place of business by using a credit card, the consumer typically runs the credit card through a card reader at the merchant's point-of-sale (POS) terminal. The merchant's POS terminal submits a transaction request to an acquirer, who authorizes or declines the transaction. The merchant typically stores all of the day's authorized transactions in a batch, and sends the batch to the acquirer at the end of the day to receive payment. The acquirer sends the batch to a card network (e.g., VISA or MasterCard), which distributes the transactions to credit card issuers. The credit card issuers transfer the transaction amounts through the card network to the acquirer, who in turn pays the merchant.

Through the credit card transaction process, the acquirer, the card network and the credit card issuers may charge fees (e.g., interchange fees, assessment fees, or discount fees) for executing the transactions. The merchant ultimately receives a payment that has these fees subtracted from the corresponding total transaction amounts. This places a financial burden on the merchant for accepting credit card payments. The merchant has no ability to reduce the fees because he has little control on how the credit card transactions are routed and executed. The merchant therefore typically transfers at least some of the financial burden to the consumer by factoring the fees into the product price.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
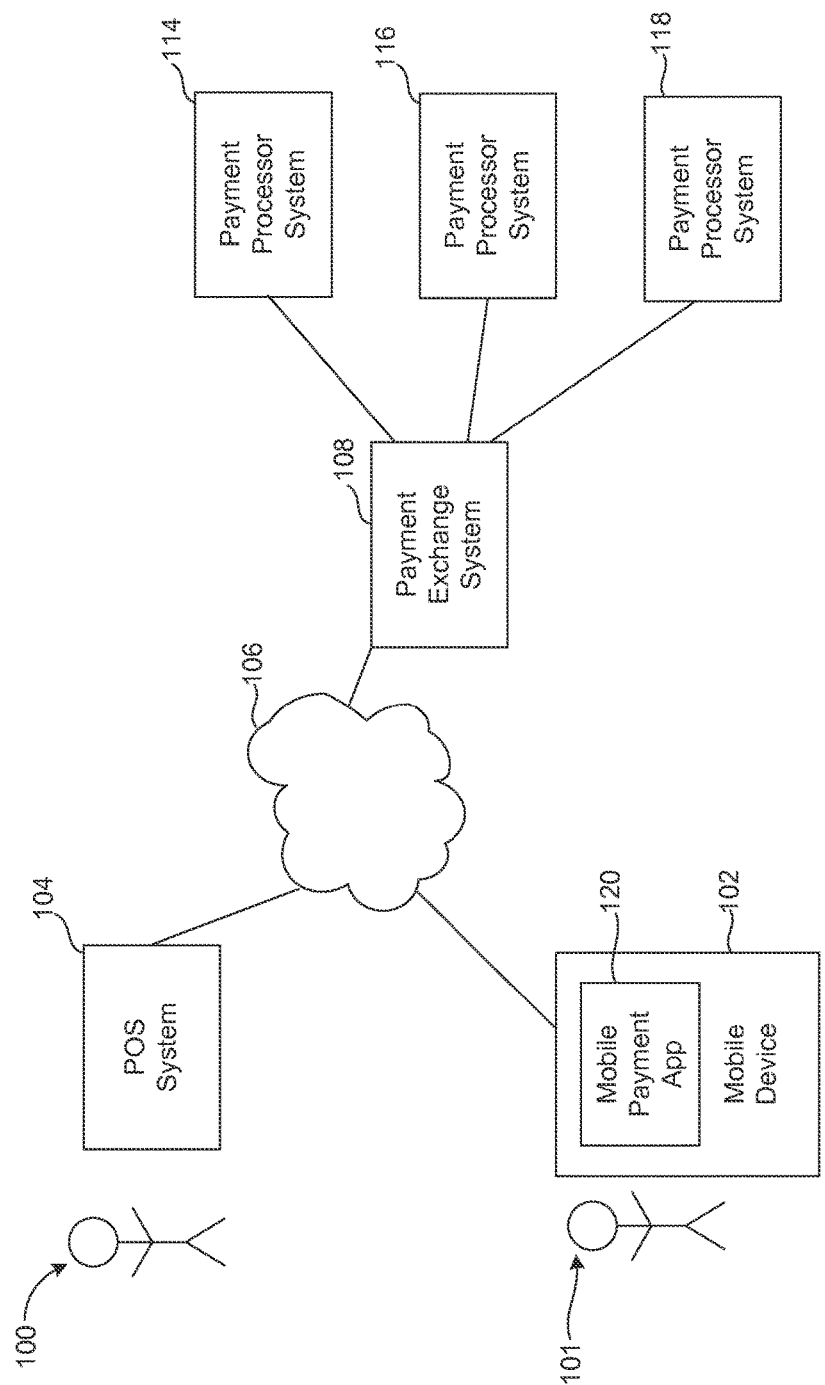
FIG. 1 illustrates an environment in which payment transaction auction exchange technology can be implemented.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is a technique that enables more efficient execution of payment transactions by use of an auction mechanism. The technique provides cost-effective processing of payment transactions, by encouraging payment processors to offer competing bidding proposals for executing the payment transactions. The bidding proposals from the payment processors have flexibility not only on the processing fee rate or reward incentives, but also on choosing the processing route of the payment transactions. For instance, to minimize the processing fee, a bidding proposal may propose executing a payment transaction by transferring funds from a particular payment account of the payer to a particular account of the payee, where both accounts are issued by the same financial institute.

According to the technique introduced here, a payment exchange server selects a winner from among one or more bidding proposals from one or more payment processors, based on the benefit to a party involved in the payment transaction (e.g., the payer, the payee, or an entity operating or owning the payment exchange server). For instance, the payment exchange server can select the bid of a payment processor who offers to charge the lowest processing fee. After receiving an authorization from the payment exchange server, the winning payment processor executes the payment transaction as proposed (an operation referred to as "clear" or "complete"). As a result, the payee (e.g., a merchant) of the transaction receives the payment and benefits from the reduced processing fee. The technique introduced here can be implemented by, for example, a mobile device for online payment, a dedicated server for routing payment transactions, a cloud server acting as a market maker for payment transaction auctions, or a combination thereof.

In the following description, the example of a customer purchasing a product from a retailer is discussed, for illustrative purpose only, to explain various aspects of the technique. Note, however, that the technique introduced here is not limited in applicability to a retailer or to any other particular kind of business. Additionally, the technique introduced here is not limited to use with payment cards. The technique can be employed with essentially any transaction that traditionally would be initiated by or involve the use of a card or a financial account. Hence, the term "transaction" refers to any type of payment-oriented transaction, including a lease or rental for example, and is not limited to an actual purchase. Note also that in this description, the term "user" generally refers to a customer or a consumer (as opposed to a merchant), except where otherwise indicated, and except that the term "user interface" does not necessarily refer to an interface used by a customer, as will be apparent from the context. Additionally, the term "sale", such as in "point-of-sale" (POS), refers to any type of payment-oriented transaction, including a lease or rental for example, and is not limited to an actual purchase.

In certain embodiments, the technique introduced here involves the following sequence of actions, as described more fully below. Initially, a customer visits a retailer and tries to purchase a product by swiping a payment card (e.g., a credit card) through a card reader of the POS system of the retailer. The POS system transfers metadata of the purchase transaction including, e.g., product price, sales tax amount, customer identification (e.g., name, card number, social security number, or phone number), retailer identification, to a payment exchange server. The payment exchange server identifies available payment accounts of the customer based on the customer identification information, as well as available receiving accounts of the retailer based on the retailer identification information. The payment exchange server sets up and manages an auction for executing the purchase transaction, including sending bidding invitations to various payment processors. The bidding invitations can include some of the metadata sent by the POS system, and/or the payment accounts and the receiving accounts identified by the payment exchange server.

Based on a bidding invitation, a payment processor decides whether to bid and accordingly may send a bid to the payment exchange server. The bid proposes a routing of the purchase transaction from a particular payment account of the customer to a particular receiving account of the retailer. The bid specifies the amount of processing fee (which can be zero) that the payment processor will charge for completing the transaction. The bid may further propose an additional reward incentive, such as offering loyalty points or a rebate to the retailer or the customer.

The payment exchange server collects the bids from the payment processors within a specific limited time period. The payment exchange server can select, as the winning bid, the bid that offers to charge the least amount of processing fee among the received bids, for example. If the winning bid proposes to charge a payment account of the customer that is not associated with the payment card being swiped, the payment exchange server may instruct the POS system to prompt the customer to decide whether to use that payment account for the purchase. The POS system may additionally present a reward incentive proposed by the winning bid, to encourage the customer to use the payment account proposed by the winning bid (instead of using an account associated with the swiped payment card). The payment exchange server then proceeds to authorize the winning payment processor to execute the purchase transaction.

Once the purchase transaction is successfully executed, the payment exchange server forwards a confirmation message from the payment processor to the POS system. The whole auction and execution process can happen in a short time period, such as three seconds, so that the customer may finish the purchase like a traditional credit card transaction without perceiving any delay.

In alternative embodiments, the payment exchange server can select a winning bid based on the benefit to a party other than the retailer. For instance, the payment exchange server can select a winning bid that offers a reward incentive that interests the customer, based on the value of the reward incentive and the customer's history of purchasing. For example, a customer may be particularly interested in accumulating frequent flyer program miles, such that the winning bid may be a bid that offers double miles for the purchase transaction.

FIG. 1 illustrates an environment in which the payment transaction auction exchange technology can be implemented. The environment includes a merchant point-of-sale (POS) system 104 of a merchant 100 and a mobile device 102 of a user 101 (also referred to as "customer" or "consumer"). The mobile device 102 can be, for example, a smart phone, tablet computer, notebook computer, or any other form of mobile processing device. A mobile payment application 120 runs on the consumer's mobile device 102. The environment also includes a computer system 108 of a payment exchange organization (hereinafter "payment exchange system 108"), and computer systems 114, 116 and 118 of various payment processors (hereinafter "payment processor systems 114, 116 and 118"). Each of the aforementioned computer systems can include one or more distinct physical computers and/or other processing devices which, in the case of multiple devices, can be connected to each other through one or more wired and/or wireless networks.

The POS system 104 and the mobile device 102 can be coupled to the payment exchange system 108 through an internetwork 106, which can be or include the Internet and one or more wireless networks (e.g., a WiFi network and or a cellular telecommunications network). The payment processor systems 114, 116 and 118 can be coupled to the payment exchange system 108 through the internetwork 106 as well. Alternatively, the payment processor systems 114, 116 and 118 can be coupled to the payment exchange system 108 through one or more dedicated networks, such as the Automated Clearing House (ACH) network.

The environment illustrated in FIG. 1 can accommodate both traditional payment card transactions (i.e., those involving reading of physical card of the customer at the merchant's location), as well as cardless transactions that are authorized on electronic devices. In a traditional credit or debit card transaction, for example, the merchant swipes the user's credit or debit card through a card reader at the POS system 104. The POS system 104 sends data read from the card (e.g., the cardholders name, credit card number, expiration date and card verification value (CVV) or debit card password) and transaction information (e.g., transaction amount, merchant identification, purchasing item, transaction limitation, etc.) to the payment exchange system 108.

Alternatively, a cardless transaction can be authorized by using the consumer's mobile device 102. Using the mobile payment application 120 running on the consumer's mobile device 102, the consumer 101 can specify the details of the transaction (e.g., merchant identification, transaction amount, purchasing item, payment method preference, etc.) and authorize the transaction payment. The mobile device 102 can communicate with the payment exchange system 108 over internetwork 106. Information about the transaction (i.e., transaction metadata or "transaction information") is transferred to the payment exchange system 108.

In response to the transaction information, the payment exchange system 108 sends bidding invitations for the payment transaction to various payment processor systems 114, 116 and 118. The bidding invitations can include some or all of the card data and transaction information. The payment exchange system 180 receives bids from at least some of the payment processor systems 114, 116 and 118, and determines a winning bid from among the bids received. The payment exchange system 180 then sends an authorization for executing the payment transaction to the winning payment processor. The winning payment processor of the auction executes to complete (i.e., clear) the payment transaction.

The payment exchange system 108 can include one or more server computers programmed to stage payment transaction auctions. The payment exchange system 108 can also store information such as credit card numbers, debit card numbers, bank accounts, other user accounts, user identifying information or other sensitive information. The payment exchange system 108 can also be responsible for storing information about merchants who have accounts with the payment exchange system 108.

Figure 2:
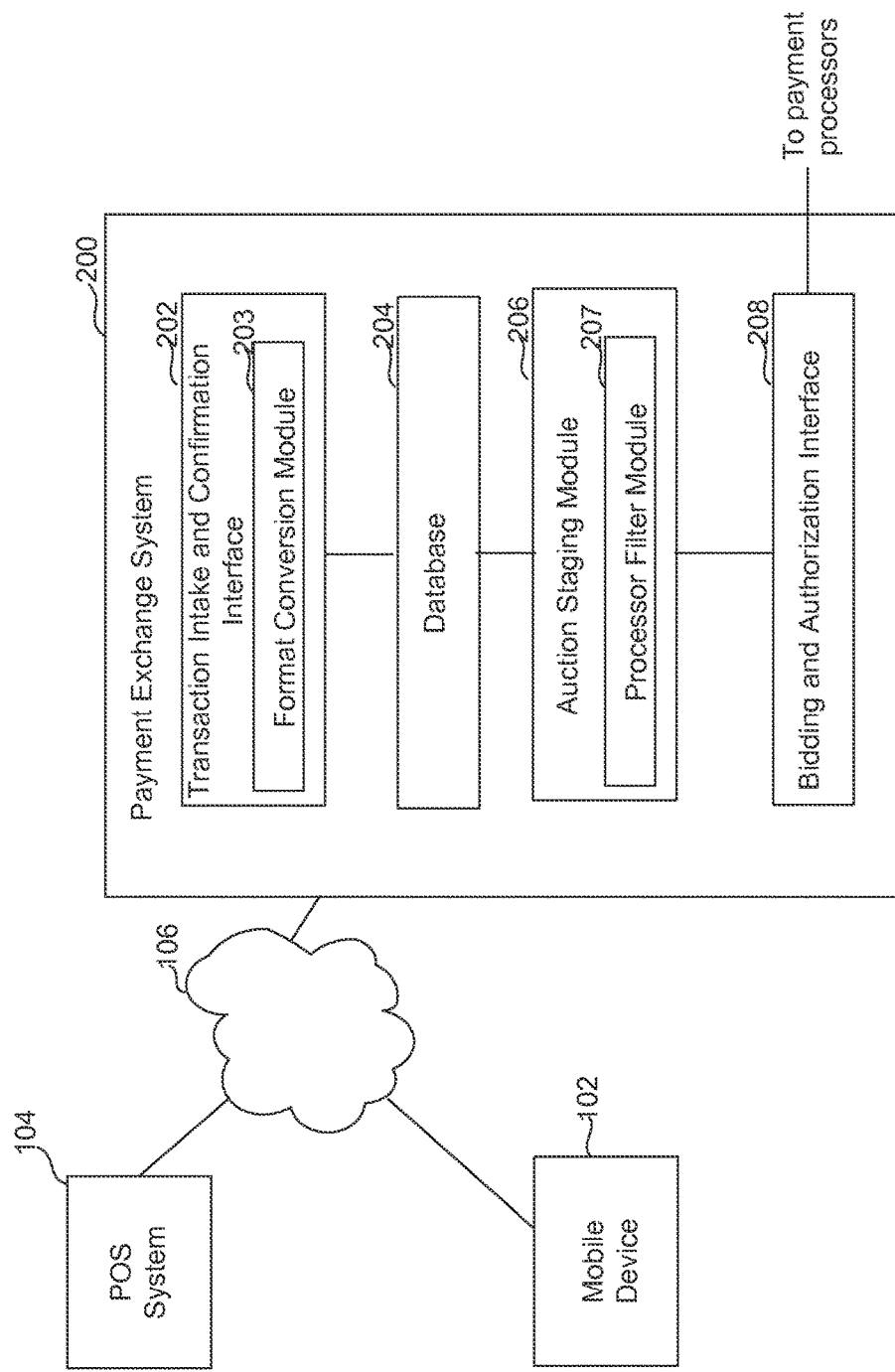
FIG. 2 illustrates an embodiment of a payment exchange system.

FIG. 2 illustrates an embodiment of the payment exchange system. Note that certain components that are not germane to this description may not be shown. The payment exchange system 200 includes a transaction intake and confirmation interface 202, a database 204, an auction staging module 206, and a bidding and authorization interface 208. The transaction intake and confirmation interface 202 communicates with the POS system 104 and/or mobile device 102 to receive metadata of the payment transaction between the consumer 101 and the merchant 100. The metadata of the payment transaction can include information regarding the consumer 101, the merchant 100 and the transaction itself. The metadata received may be in a format that is standard to the financial industry or the e-business industry, such as Open Financial Exchange (OFX), Interactive Financial Exchange (IFX), or eXtensible Business Reporting Language (XBRL). The transaction intake and confirmation interface 202 can include a format conversion module 203 for converting the received metadata into a format that is set as a standard format for the payment exchange system 200. Alternatively, the format conversion module 203 can be part of the auction staging module 206.

The payment transaction metadata (e.g., converted metadata) are stored in the database 204. The database 204 can include data other than the transaction metadata. For instance, the database 204 can store information for payment accounts of the consumer 101, such as credit card numbers, debit card numbers, bank accounts, online money transfer accounts, or home equity line of credit accounts. The database 204 can further store information regarding financial institutions or organizations that have conducted business or likely will conduct business with the consumer 101. For instance, the database 204 may store information regarding that the consumer 101 has an automobile loan with a credit union, or that the consumer 101 has obtained umbrella insurance from an insurance company.

The database 204 can also store information regarding various payment processors. The database 204 may store information regarding the types of payment transactions a payment processor can handle. For instance, the payment processor of the system 114 may only be interested or specialized in executing payment transactions between U.S. merchants and German citizens residing in U.S.

In accordance with the technology introduced here, the auction staging module 206 (also referred to as "decision module") sets up an auction for executing the payment transaction. The auction staging module 206 may specify rules of the auction. For instance, the rules can include a time period within which the payment processors can bid on the auction by responding to the bidding invitations, an upper or lower limit on processing fee that can be charged for executing the payment transaction, or a requirement that only payment processors that have existing business relationships with the consumer 101 can submit bids for a transaction involving the consumer 101. Alternatively, a user or operator of the payment exchange system may specify the rules. The specified rules may be stored in a database (e.g., database 204 or a separate database) within the payment exchange system 200.

The auction staging module 206 or a user of the payment exchange system 200 can decide the amount of information to be included in the bidding invitations. Depending on the requests from the merchant 100, consumer 101 and the payment processors, the auction staging module 206 may decide to disclose minimal information that are necessary for the payment processors to bid on the auction, or enough information for the payment processors to clear the payment transaction, or even to disclose certain valuable information regarding the merchant 100 or the consumer 101 to attract bidding from the payment processors. The auction staging module 206 can also specify rules on what information will be available to the winning bidder. Thus, a payment processor may lower its processing fee or offer extra incentives to receive extra details of the transaction for business purposes such as marketing analysis.

In the illustrated embodiment, the auction staging module 206 includes a processor filtering module 207. The processor filtering module 207 filters out payment processors that do not conform to the rules specified by the auction staging module 206. For instance, if the auction staging module 206 specifies allowing bids only from the payment processors that have existing business relationships with the consumer 101, payment processors that have no existing business relationships with the consumer 101 are filtered out. Similarly, if the auction staging module 206 specifies allowing bids only from banks with which the consumer 101 have accounts, other banks or institutes are filtered out from the auction. The processor filtering module 207 may directly select payment processors instead. The rules for filtering out or selecting payment processors may be instructed by the merchant 100 or the consumer 101. For instance, the consumer 101 can set a requirement that the consumer only wants to pay for the transaction using one of his existing accounts (instead of, e.g., accepting an offer for opening a new financial account for paying the transaction). Accordingly the auction staging module 206 can set up a rule allowing bids only from payment processors that are capable of handling existing accounts of the consumer 101.

Although the transaction intake and confirmation interface 202 and the bidding and authorization interface 208 are separate in the illustrated embodiment, alternatively the interfaces 202 and 208 can be implemented as a single interface, e.g., a networking interface.

The bidding and authorization interface 208 sends out bidding invitations to the remaining available payment processors that survive the filtering process. In response to the bidding invitations, one or more payment processors send back their bids to the bidding and authorization interface 208. An auction bid can include a processing fee proposal for executing the payment transaction. An auction bid can also include an incentive proposal that offers an extra incentive (e.g., rebate, frequent flyer miles, coupon, discount, loyalty program points, gift, or a combination thereof) to the consumer 101 or the merchant 100. The auction bid can also specify the routing to clear the payment transaction. For instance, the auction bid may propose to use one of the consumer's existing financial institute account to pay for the transaction, or propose to offer the consumer an new financial account (e.g., a credit account or loan account) to pay for the transaction.

The auction staging module 206 can specify or access an auction rule on how to decide the winning bidder. For instance, the auction staging module 206 may specify that the bid benefiting the consumer 101 the most wins, or that the bid benefiting the merchant 100 the most wins. Alternatively, the auction staging module 206 may specify that the bid benefiting an entity owning or operating the payment exchange system 200 the most wins. The auction staging module 206 may also specify an auction rule that consider the benefits of multiple parties including, e.g., the merchant 100, the consumer 101, or the owner or operator of the payment exchange system 200. The bidding payment processors may or may not be aware of this auction rule, and therefore are not discouraged from bidding by the auction rule.

The auction staging module 206 may confirm the winning bid with the consumer 101 or merchant 100. For instance, the payment exchange system 200 sends the winning bid to the POS system 104 or the mobile device 102 through the transaction intake and confirmation interface 202. The consumer 101 or the merchant 100 can confirm and authorize the payment method proposed by the winning bid through the mobile device 102 or the POS system 104.

Alternatively, the auction staging module 206 can allow the consumer 101 or the merchant 100 to decide the winning bid. The payment exchange system 200 sends the bids to the POS system 104 or the mobile device 102 through the transaction intake and confirmation interface 202. The POS system 104 or the mobile device 102 can list the bids with the processing fee proposal, incentive proposal or other information regarding the bids. The consumer 101 or the merchant 100 can select a winning bid from the list. The POS system 104 or the mobile device 102 sends the choice of the winning bid back to the payment exchange system 200 through the interface 202.

The auction staging module 206 proceeds to authorize the winning payment processor to execute the payment transaction according to the proposal of the winning bid. Once the payment transaction is cleared, the winning bidder (i.e., payment processor) confirms the successful payment transaction completion with the payment exchange system 200 through the bidding and authorization interface 208. The payment exchange system 200 can forward the confirmation to the POS system 104 or the mobile device 102.

The payment exchange system 200 can be implemented as a server or a computing device (e.g., a mobile device). For instance, when a mobile device functions as a payment exchange system, the mobile device may further include a user interface (e.g., interface 400 illustrated in FIG. 4) interacting with the consumer or the merchant.

Figure 3:
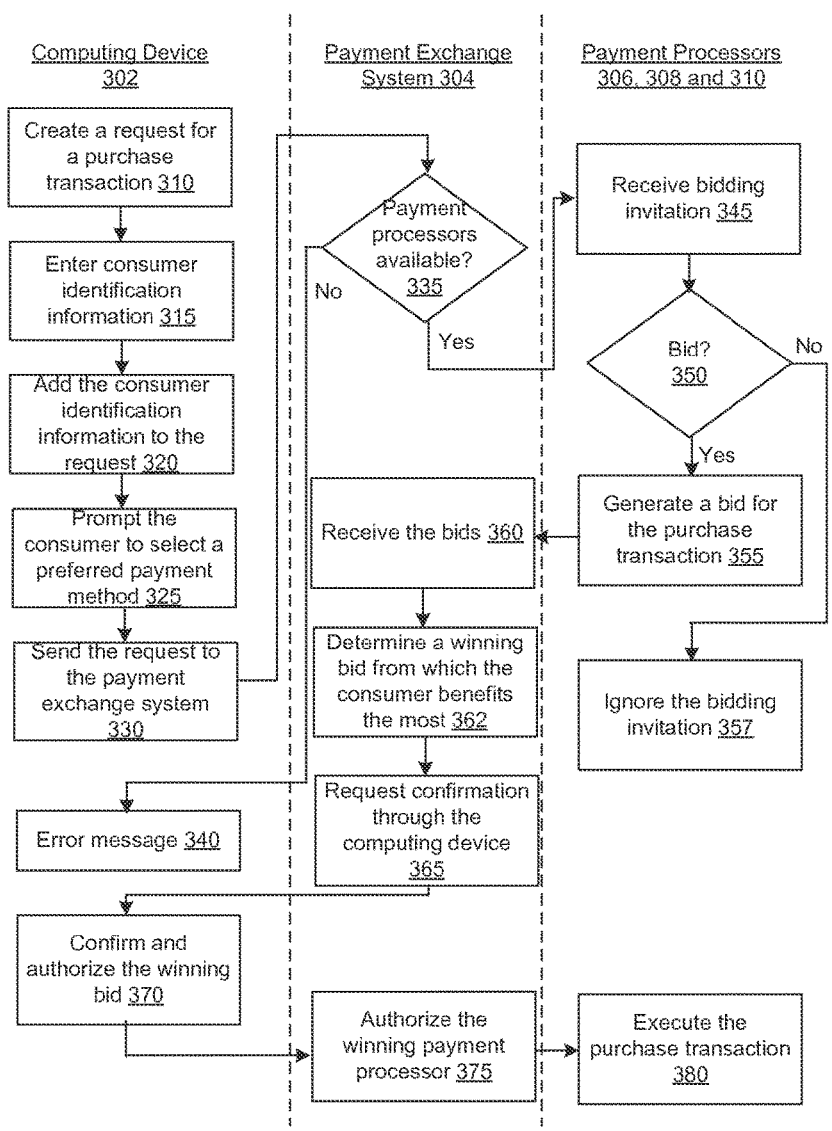
FIG. 3 illustrates an example of a process of initiating and setting up a payment transaction auction benefiting a consumer, according to a first embodiment.

FIG. 3 illustrates an example of a process of initiating and setting up a payment transaction auction benefiting a consumer, according to a first embodiment of the technology introduced here. The process involves relationships between a computing device 302, a payment exchange system 304, and payment processors 306, 308 and 310. The payment exchange system 304 can be configured to send and receive communications to and from the computing device 302. The communications can be encrypted using secure protocols built into the computing device 302 and the payment exchange system 304.

The computing device 302 can be owned or operated, e.g., a consumer or a merchant. The payment transaction may be initiated by a consumer or a merchant interacting with the computing device 302. The computing device 302 can be, e.g., a mobile device.

Initially, the computing device 302 creates a request for a purchase transaction (step 310). The request may be created automatically, for example, when a button of a payment application on the computing device 302 is clicked. The request can include an identity of the merchant and an identity of the product that the consumer is purchasing.

The consumer can identify himself by entering identification information on the computing device 302 (step 315). For instance, the consumer can log into a user account on the computing device 302. Alternatively, the consumer can enter certain personal information, e.g., drive license number or social security number, into the computing device 302 to identify the consumer. Then the computing device 320 adds the consumer identification information to the request (step 320).

Subsequently, the computing device 302 prompts the consumer to select a preferred payment method that is known to the computing device 302 (step 325). The available payment methods can be previously stored in a user account accessible by the computing device 302, for example. If the consumer selects a preferred payment method, the computing device 302 adds the information of the preferred payment method to the request. The computing device 302 may further provide the consumer options to decline, ignore, or skip the prompt.

The computing device 302 sends the request for the purchase transaction to the payment exchange system 304 (step 330). The request may include existing payment methods of the consumer. Alternatively, the payment exchange system 304 has stored the existing payment methods of the consumer.

The payment exchange system determines whether there are available payment processors capable of handling payment methods of the consumer (step 335). If there is no payment processor capable of handling the payment methods of the consumer, the payment exchange system 304 can send an error message to the computing device 302 indicative that the transaction request cannot be processed (step 340).

When multiple payment processor are available to handle the request, the payment exchange system 304 sends bidding invitations to the payment processors 306, 308, 310 (step 345). The bidding invitations may include metadata regarding the purchase transaction, such as the purchase price, item name, consumer identification and/or merchant identification.

Each of the payment processor 306, 308 and 310 determines whether to bid on the auction for executing the payment transaction (step 350). If a payment processor determines to bid, the payment processor generates a bid for the purchase transaction (step 355). If the payment processor determines not to bid, the payment processor simply ignores the bidding invitation (step 357). The bid proposes a payment method for the consumer involving a specific payment account of the consumer and a specific merchant account for receiving the payment for the merchant. The bid specifies the amount of processing fee or offers zero processing fee for executing the payment transaction. The bid can further propose an incentive, such as doubling the frequent flyer miles or offering a rebate. Note that the specific format and communication protocol of the bid are unimportant, as long as they are understood by the payment processors and the payment exchange system; that is, any known or convenient data format and/or communication protocol can be used.

The specific payment account of the consumer can be an existing account of the consumer, or a new payment account being offered by an entity associated with the payment processor. Similarly, the specific merchant account of the merchant can be an existing account of the merchant, or a new account being offered by an entity associated with payment processor.

Subsequently, the payment exchange system 304 receives the bids from the payment processors (step 360). The payment exchange system 304 determines a winning bid from which the consumer benefits the most (step 362). For example, the winning bid may be the bid that offers the consumer the largest amount of rebate, or the most frequent flyer miles, or the most loyalty program points.

The payment exchange system 304 then requests confirmation of the payment method of the winning bid with the consumer through the computing device 302 (step 365). The consumer can confirm and authorize the payment method of the winning bid on the computing device 302 (step 370). Additionally, the merchant may also confirm the merchant account proposed by the winning bid for receiving the payment on the computing device 302. In case that the winning bid proposes offering a new account to the consumer or the merchant, the payment exchange system 604 may forward the offer to the computing system 302 so that the consumer or the merchant can decide whether to open the new account.

The payment exchange system 304 authorizes the winning payment processor to execute the purchase transaction (step 375). Then the winning payment processor executes the purchase transaction (step 380). The execution of the purchase transaction may involve, e.g., transferring the fund from a consumer account to a merchant account, charging the processing fee from the merchant (alternatively, from the consumer or the payment exchange system), and realizing the promised incentive.

The winning payment processor may confirm the execution of the purchase transaction with the payment exchange system 304. The payment exchange system 304 may further forward the confirmation to the computing device 302.

The steps can be performed in a short time period such that the consumer finishes the transaction instantly, i.e., in essentially the same amount of time that a traditional credit card transaction would take. For example, after the consumer logs into an account on the computing device 302, the computing device 302 can immediately list various credit card account, debit card accounts and bank accounts that the consumer can use to make the purchase, along with the incentives proposed by the payment processors. The consumer chooses one of the accounts by clicking on the screen of the computing device 302. The computing device 302 immediately confirms that the purchase transaction has been completed and that the incentive has been realized.

Figure 4:
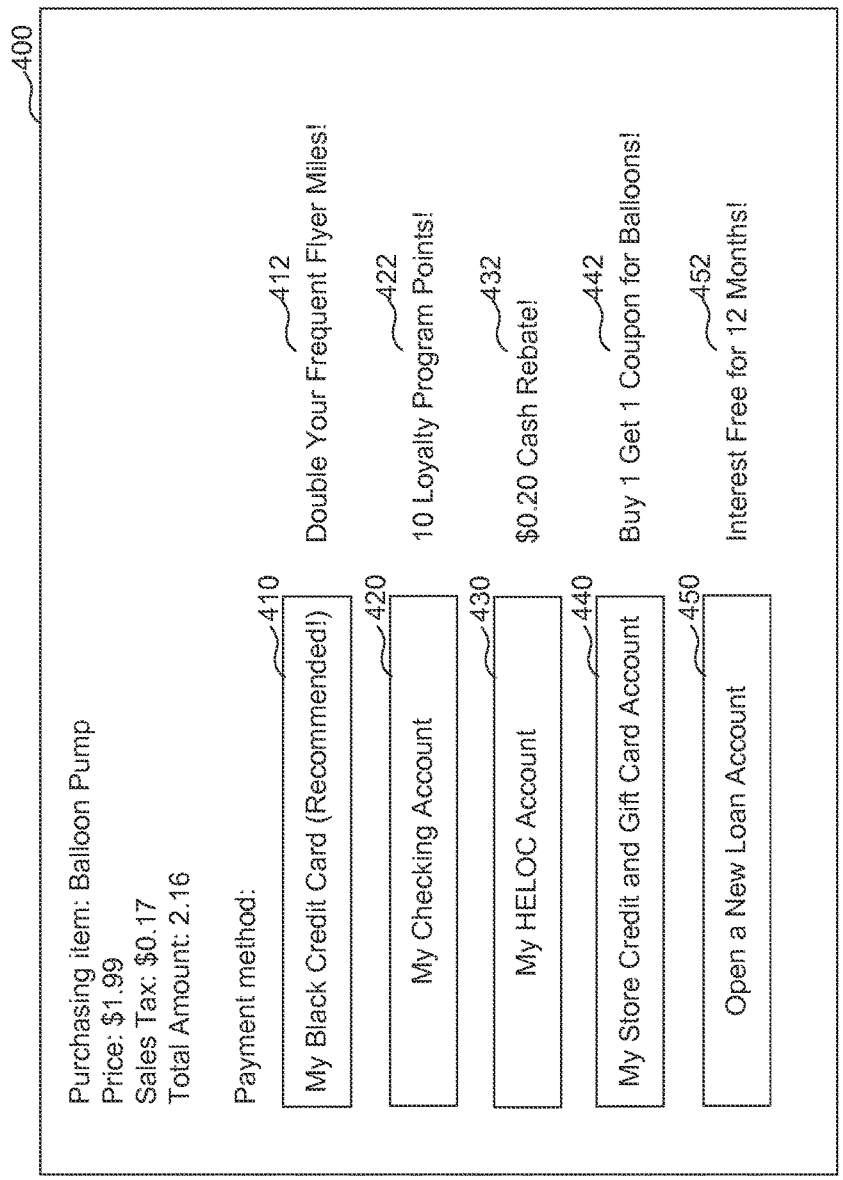
FIG. 4 illustrates an example of a graphical user interface showing a list of payment methods along with incentives offered by payment processors.

FIG. 4 illustrates an example of a graphical user interface showing a list of payment methods along with incentives offered by payment processors. The top portion of the interface 400 shows various information regarding the purchase, such as product name or description, price, sales tax, and total amount. The interface 400 lists five buttons 410, 420, 430, 440 and 440 for a consumer to determine the payment method. For instance, interface 400 shows a button 410 "My Black Credit Card (Recommended!)" along with a promotion message 412 "Double Your Frequent Flyer Miles!" The button 410 and the promotion message 412 correspond to a winning bid that proposes to execute the payment transaction by extracting funds from a credit card account ("My Black Credit Card") and to offer double frequent flyer miles as an incentive for the consumer to choose the payment method.

Similarly, the button 420 "My Checking Account" and the promotion message 422 "10 Loyalty Program Pointes" correspond to a bid that proposes to execute the payment transaction by extracting funds from a checking account and to offer loyalty points as incentive. The button 430 "My HELOC Account" and the promotion message 432 "$0.20 Cash Rebate!" correspond to a bid that proposes to execute the payment transaction by extracting funds from a home equity line of credit (HELOC) account and to offer cash rebate as incentive. The button 440 "My Store Credit and Gift Card Account" and the promotion message 442 "Buy 1 Get 1 Coupon for Balloons!" correspond to a bid that proposes to execute the payment transaction by extracting funds from a store credit or gift card account and to offer a coupon as incentive. The button 450 "Open a New Loan Account" and the promotion message 452 "Interest Free for 12 Months!" correspond to a bid that proposes to execute the payment transaction by opening a new loan account and extracting funds from the loan account. The payment processor that proposes opening the new loan account further offers zero interests as incentive for the consumer to choose the payment method.

The consumer can click any of the buttons 410, 420, 430, 440 and 450 to choose a payment method proposed by one of the bids. If the consumer clicks the button 410, the computing device 302 sends a message back to the payment exchange system 304 to confirm executing the payment transaction according to the winning bid. If the consumer clicks a button other than the button 410, the computing device 302 sends a message to the payment exchange system 304 to overwrite the winning bid, i.e., instructing the payment exchange system 304 to send authorization for executing the payment transaction to a payment processor that proposed a bid corresponding to the clicked button. The user interface may offer a specific time period for the consumer to respond. After the time period expires, the computing device 302 may either cancel the payment transaction request, or automatically confirm the winning bid.

Figure 5A:
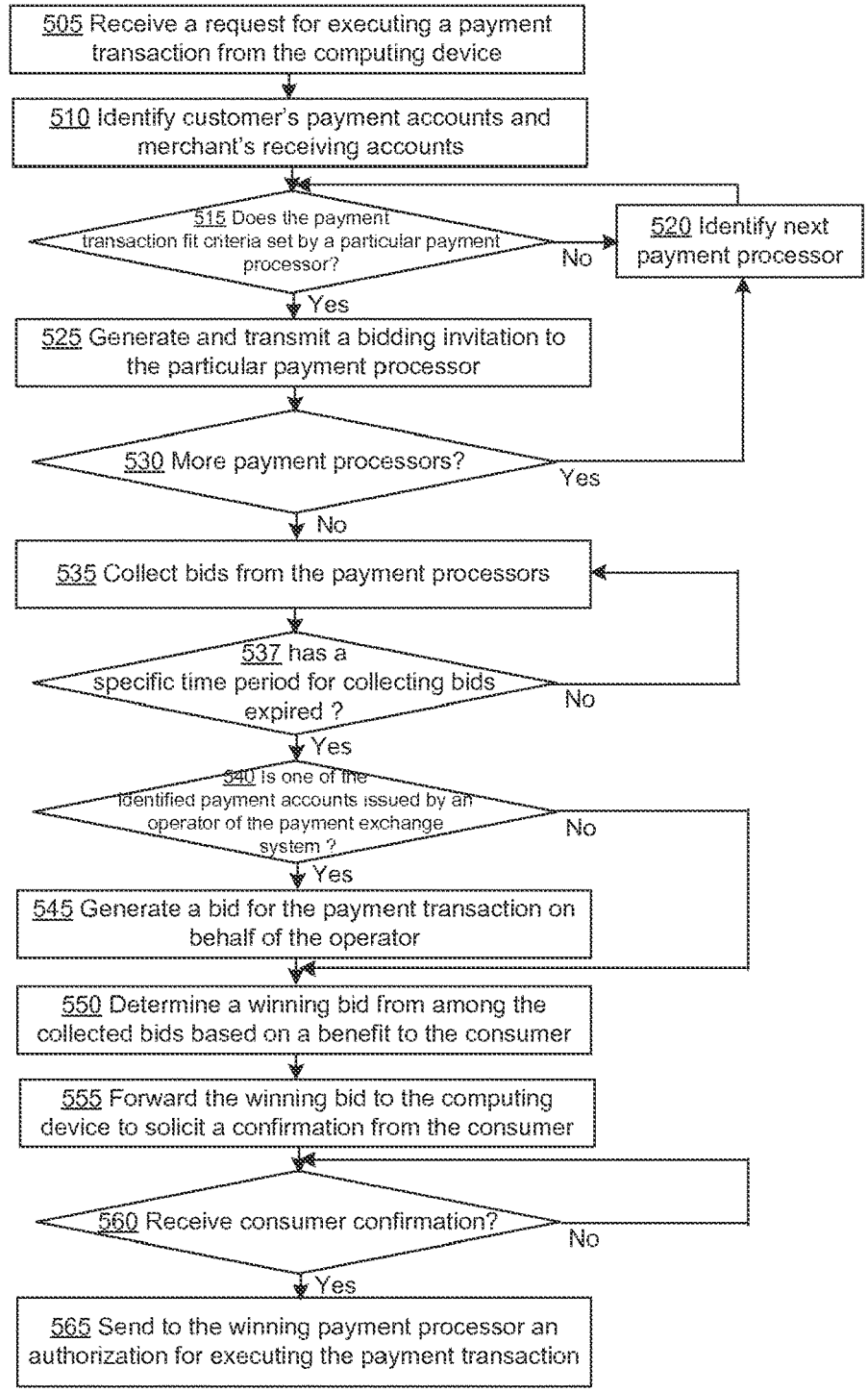
FIG. 5A illustrates an example of a transaction auction process that can be performed by the payment exchange system, according to the first embodiment.

FIG. 5A illustrates an example of a transaction auction process that can be performed by the payment exchange system, according to the first embodiment. The process 500 illustrated in FIG. 5A can be executed by, e.g., the payment exchange system 304 of FIG. 3. The process 500 begins when the payment exchange system 304 receives a request for executing a payment transaction from the computing device 302 (step 505). The request can include various metadata regarding the consumer, the merchant, and the product or service involved in the transaction. For instance, the metadata of the request can include a consumer identity, a merchant identity, a transaction identification, payment card information, purchasing item information, price, expiration time, currency, geographic location of the consumer, geographic location of the merchant, a consumer transaction history, or a risk estimation of the payment transaction.

The request is in response to a consumer action, e.g., swiping a consumer's payment card or initiating a payment authorization from a mobile payment application running on the computing device 302. The payment card can be, e.g., a credit card, a debit card, or a proxy card associated with multiple payment accounts of the consumer. The payment authorization can be generated, for example, from a metacard or a virtual wallet. The mobile payment application can establish a virtual wallet for the consumer to store various payment accounts including, e.g., credit cards, debit cards, loyalty cards and gift cards. Similarly, the mobile payment application can establish a metacard for the consumer. A consumer can dynamically switch between payment accounts that are represented by the metacard.

After receiving the request for executing the payment transaction, the payment exchange system 304 identifies one or more payment accounts of the consumer based on the consumer identity and one or more receiving accounts of the merchant based on the merchant identity (step 510). Then, the payment exchange system 304 determines whether the payment transaction satisfies criteria set by a particular payment processor (step 515). If the payment transaction does not fit the criteria, the process 500 disregards the current payment processor and proceeds to identify the next payment processor (step 520). If the payment transaction satisfies the criteria, the payment exchange server 304 generates and transmits a bidding invitation for the payment transaction to the particular payment processor (step 525). This criteria mechanism allows payment processors that specializes in particular areas to participate the payment transaction auctions. For instance, a payment processor company may be specializing in high-risk payments because of their fraud detection system and high-return collection process. The payment processor company can set criteria to accept bidding invitations for high-risk payment transactions only. Thus, a market gap is filled, since otherwise likely no other processors want to handle these high-risk payment transactions.

The bidding invitation includes a subset of metadata that is enough for the payment processor to decide whether to bid on the payment transaction. The bidding invitation can further include the identified payment accounts of the consumer or the identified receiving accounts of the merchant. The payment processors may be represented by endpoint systems associated with payment processor entities, such as payment processing platforms, credit card companies, credit card networks, banks, or loan companies.

The process 500 proceeds to determine whether there are more payment processors potentially can participate the bidding (step 530). If there are more payment processors, the process 500 proceeds to step 520 to identify the next payment processor for sending out more bidding invitations. When there are no more payment processors left for generating bidding invitations, the process 500 proceeds to step 535. The bid invitations can be sent out sequentially or concurrently. For instance, the bidding invitations for different payment transactions can be transmitted to the payment processors in concurrent real-time data streams.

The payment exchange server 304 collects bids from the payment processors (step 535). The bids can include proposals regarding processing fees and/or rewarding incentives relating to the payment transaction. A bid can further include a proposal of executing a payment transaction by transferring a fund from a particular payment account of the consumer to a particular receiving account of the merchant. The particular payment account may be one of the identified payment accounts of the consumer, or a new payment account being offered in the bid by the payment processor. Similarly, the particular receiving account may be one of the identified receiving accounts of the merchant, or a new receiving account being offered in the bid by the payment processor.

If the payment exchange server 304 determines that a specific time period for collecting bids has expired (step 537), the process 500 stops collecting bids and proceeds to step 540.

The payment exchange server 304 can further determine whether one of the identified payment accounts is issued by an operator (or owner) of the payment exchange system (step 540). If there is an identified payment account issued by the operator, the payment exchange system can generate a bid for the payment transaction on behalf of the operator (step 545). In this way, the operator of the payment exchange system can participate in the auction as a bidder as well.

The payment exchange server 304 determines a winning bid from among the collected bids based on a benefit to the consumer (step 550). The benefit to the consumer can be measured by, e.g., the reward incentives proposed by the bids. For instance, a winning bid can be selected by determining a reward incentive that is likely to be of greatest interest to the consumer, based on a history of user inputs in response to bids of past payment transactions. In some alternative embodiments, the winning bid can be determined based on a benefit to another party involved in the payment transaction (e.g., the merchant or the operator), or based on a combination of the benefits to multiple parties.

The payment exchange server 304 forwards the winning bid to the computing device 302 to solicit a confirmation from the consumer (step 555). The computing device 302 may present a recommendation based on the winning bid on a user interface component of the computing device 302, along with other bids accompanied with the proposed rewarding incentives. The consumer may confirm the winning bid by clicking on the user interface component.

If a consumer confirmation of the winning bid is received (step 560), the payment exchange server 304 sends an authorization for executing the payment transaction to the winning payment processor (step 565).

Figure 5B:
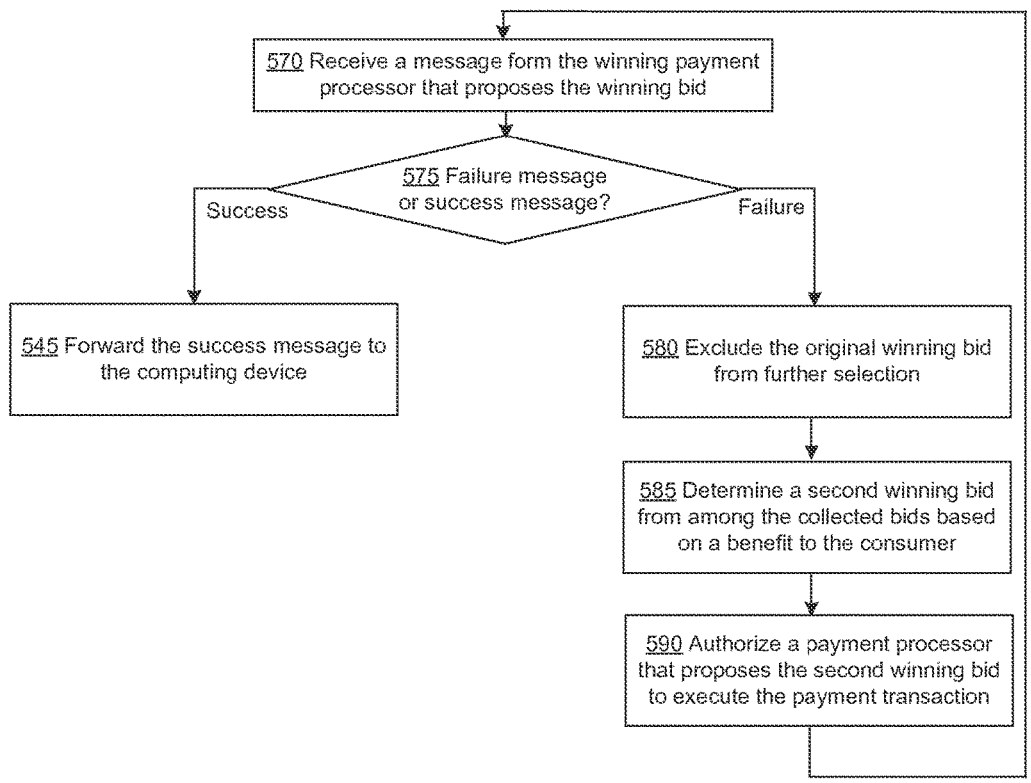
FIG. 5B illustrates an example of a failure recovery process that can be performed by the payment exchange system, according to the first embodiment.

FIG. 5B illustrates an example of a failure recovery process that can be performed by the payment exchange system, according to the first embodiment. The payment exchange server 304 receives a message from the winning payment processor that proposed the winning bid (step 570). The payment exchange server 304 determines whether the message is a failure message or a success message, indicating a failure or success of executing the payment transaction, respectively (step 575).

If the message is a failure message indicative of a failure of executing the payment transaction, the payment exchange server 304 excludes the original winning bid from further selection (step 580). Then the payment exchange server 304 determines a second winning bid from among the collected bids based on a benefit to the consumer (585) and authorizes a payment processor that proposes the second winning bid to execute the payment transaction (590).

If the message is a success message, which is indicative of a success of executing the payment transaction, the payment exchange server 304 forwards the success message to the computing device 302 (step 595).

Figure 6:
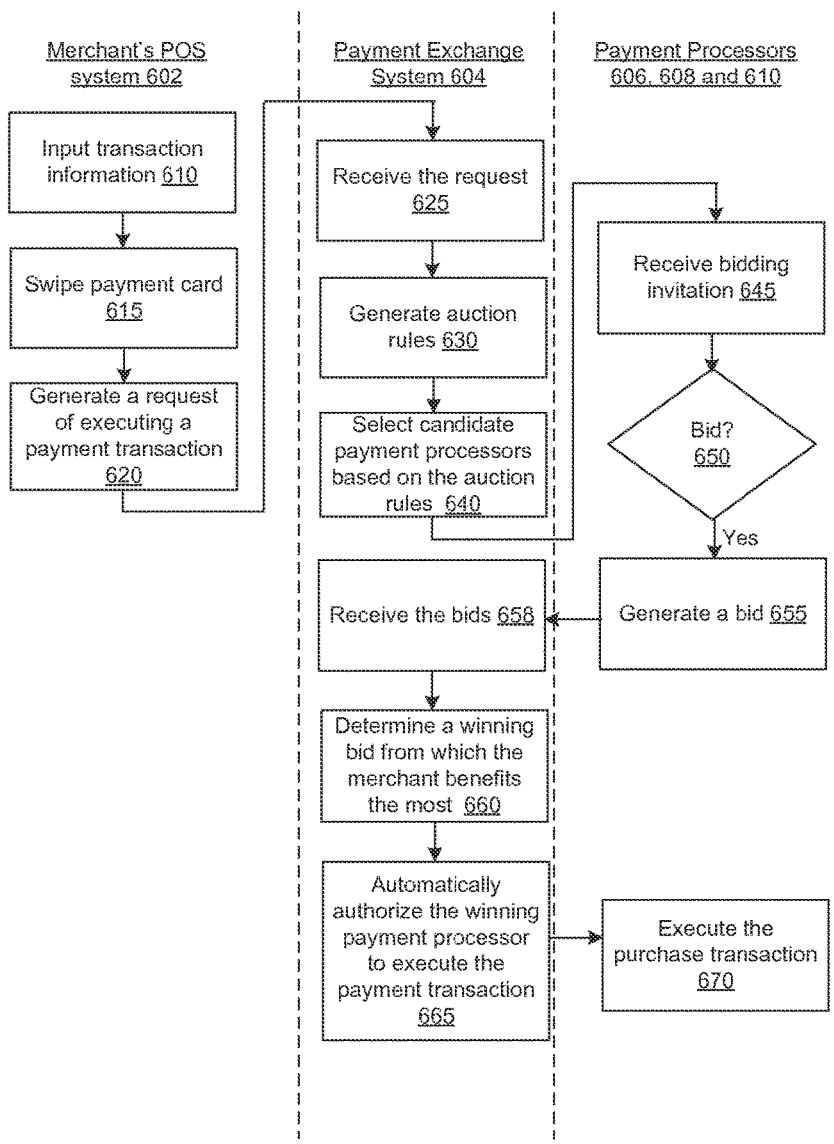
FIG. 6 illustrates an example of a process of initiating and setting up a payment transaction auction benefiting a merchant, according to a second embodiment.

FIG. 6 illustrates an example of a process of initiating and setting up a payment transaction auction benefiting a merchant, according to a second embodiment of the technology introduced here. The process involves relationships between the merchant's POS system 602, the payment exchange system 604, and the payment processors 606, 608 and 610.

Initially, the merchant inputs the transaction information to the POS system 602 by, e.g., scanning a barcode of a product that the consumer is purchasing (step 610). A display of the POS system 602 may visualize the name and the price of the product. Then a consumer can authorize the purchasing transaction and identifies himself by swiping his payment card through the POS system 602 (step 615). The payment card can be a credit card, a debit card, a proxy card, or an identification card that identifies the consumer.

The POS system then generates a request of executing a payment transaction between the consumer and the merchant (step 620). The request includes information identifying the consumer and the merchant and specifying the payment amount. The request may further include details of the transaction, e.g., the name or description of the product. The POS system 602 sends the request to the payment exchange system 604 (step 625).

Additionally, the payment exchange system 604 generates auction rules (step 630). For example, if the consumer prefers paying the transaction using credit cards, the auction rules may only allow participations of payment processors that are capable of handling credit card payments. The payment exchange system 604 selects candidate payment processors based on the auction rules (step 640). For example, payment processors specializing in bank transferring or debit card processing may be excluded based on the auction rules if the consumer prefers credit card payment. Similarly, the payment exchange system 604 may exclude payment processors that cannot handle the merchant's payment accounts.

The payment exchange system 604 sends bidding invitations to the candidate payment processors (e.g., payment processors 606, 608 and 610) (step 645). The bidding invitations do not necessarily include all information that the payment exchange system 604 receives from the POS system 602. For example, the payment exchange system 604 may decide to send to the payment processors minimal information that is enough for the processors to bid on the auction. Alternatively, the payment exchange system 604 may decide to send to the payment processors details of the transaction, in order to attract more processors to bid on the auction. The bidding invitations can include information regarding existing accounts of the consumer and/or the merchant.

Each of the payment processor 606, 608 and 610 determines whether to bid on the payment transaction auction (step 650). If a payment processor determines to bid, the payment processor generates a bid for the auction (step 655). The bid proposes executing the transaction by transferring a fund from a specific payment account of the consumer and a specific merchant account of the merchant.

The bid specifies the amount of processing fee (or even offers zero processing fee) based on the payment processor's ability of handling the fund transferring between these two specific account. For example, a bank account among the consumer's payment accounts and a bank account among the merchant accounts may be associated with the same bank. A payment processor associated with the same bank may be able to charge a low or even zero processing fee because of the low cost of transferring a fund between accounts within the same bank.

The payment exchange system 604 receives the bids from the payment processors (step 658). The payment exchange system 604 then determines a winning bid from which the merchant benefits the most (step 660). For example, the winning bid may be the bid that proposes to charge the merchant the least amount of processing fee (or zero processing fee). In some embodiments, the payment exchange system 604 may charge an additional commission fee to the payment processor, the merchant, the consumer, or multiple parties thereof.

The payment exchange system 604 may automatically authorize the winning payment processor to execute the payment transaction, without seeking further confirmation from the merchant or the consumer (step 665). Alternatively, the payment exchange system 604 can seek confirmation of the winning bid from the merchant or the consumer through the POS system 602. In case that the winning bid offers a new payment account, the payment exchange system 604 may forward the offer to the POS system 602 so that the consumer can decide whether to open the new account.

In response to the authorization from the payment exchange system 604, the winning payment processor executes the payment transaction (step 670). The execution of the payment transaction may involve, e.g., transferring a payment fund from a consumer account to a merchant account as proposed by the winning bid, charging the processing fee if there is one (e.g., by deducting the processing fee from the payment fund), and/or paying a commission fee to the payment exchange system 604.

The winning payment processor may confirm the execution of the purchase transaction with the payment exchange system 604. The payment exchange system 304 may forward the confirmation to the POS system 602 to acknowledge the completion of the payment transaction.

Figure 7A:
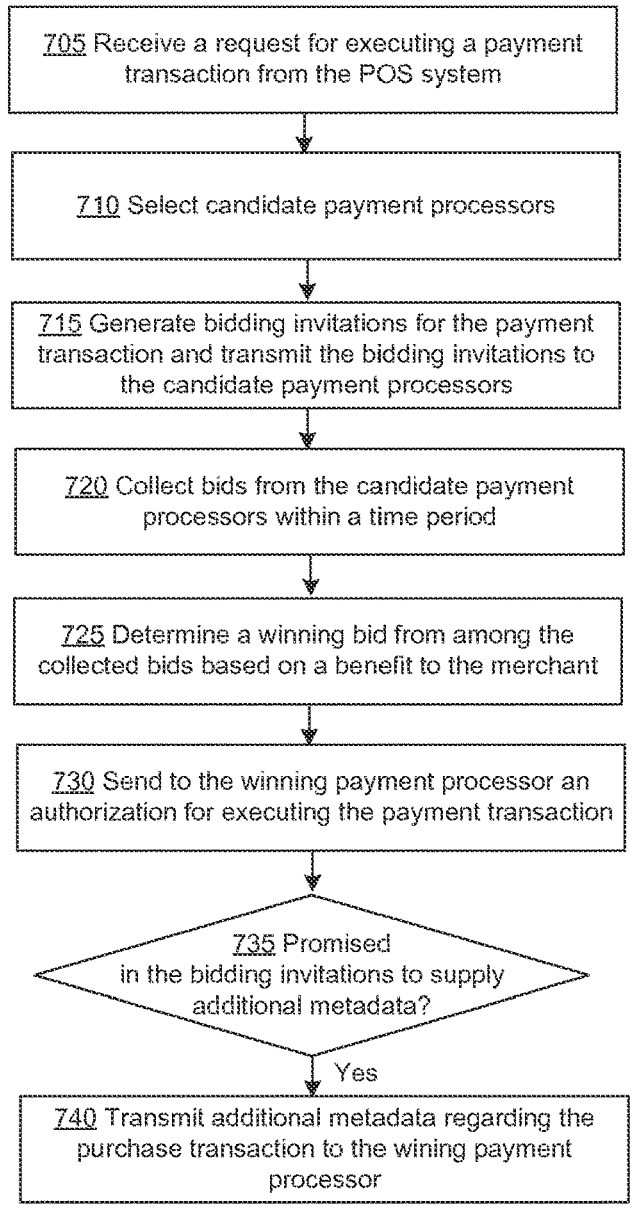
FIG. 7A illustrates an example of a transaction auction process that can be performed by the payment exchange system, according to the second embodiment.

FIG. 7A illustrates an example of a transaction auction process that can be performed by the payment exchange system, according to the second embodiment. The process 700 illustrated in FIG. 7A can be executed by, e.g., the payment exchange system 604 of FIG. 6. The process 700 begins when the payment exchange system 604 receives a request for executing a payment transaction from the POS system 602 (step 705).

The payment exchange system 604 selects candidate payment processors from the available payment processors (step 710). The payment transaction satisfies the criteria set by the candidate payment processors. The payment exchange server 604 generates bidding invitations for the payment transaction and transmits the bidding invitations to the candidate payment processors (step 715). The bidding invitation can include a subset of metadata of the request that is enough for the payment processor to decide whether to bid on the payment transaction. The bidding invitations can further indicate that additional metadata of the payment transaction will be available to the winning payment processor. This gives the payment processors incentives to bid because the payment processors may have business interests in acquiring the additional metadata (e.g., for marketing research).

The payment exchange server 604 collects bids from the candidate payment processors within a time period (step 720). The bids can include proposals regarding processing fees and/or rewarding incentives relating to the payment transaction. After the time period expires, the payment exchange server 604 determines a winning bid from among the collected bids based on a benefit to the merchant (step 725). The benefit to the merchant can be measured by, e.g., the processing fees proposed by the bids. A bid proposing the least amount of processing fee can be selected as the winning bid.

In some alternative embodiments, the winning bid can be determined based on a benefit to another party involved in the payment transaction (e.g., the consumer or an owner of the payment exchange server 604).

Then the payment exchange server 604 sends to the winning payment processor an authorization for executing the payment transaction to the winning payment processor (step 730). If the payment exchange server 604 promised in the bidding invitations to supply additional metadata (step 735), the payment exchange server 604 can transmit additional metadata regarding the purchase transaction to the wining payment processor (step 740). The additional metadata may have business values to the winning payment processor (e.g. for marketing or consumer behavior research purposes).

Figure 7B:
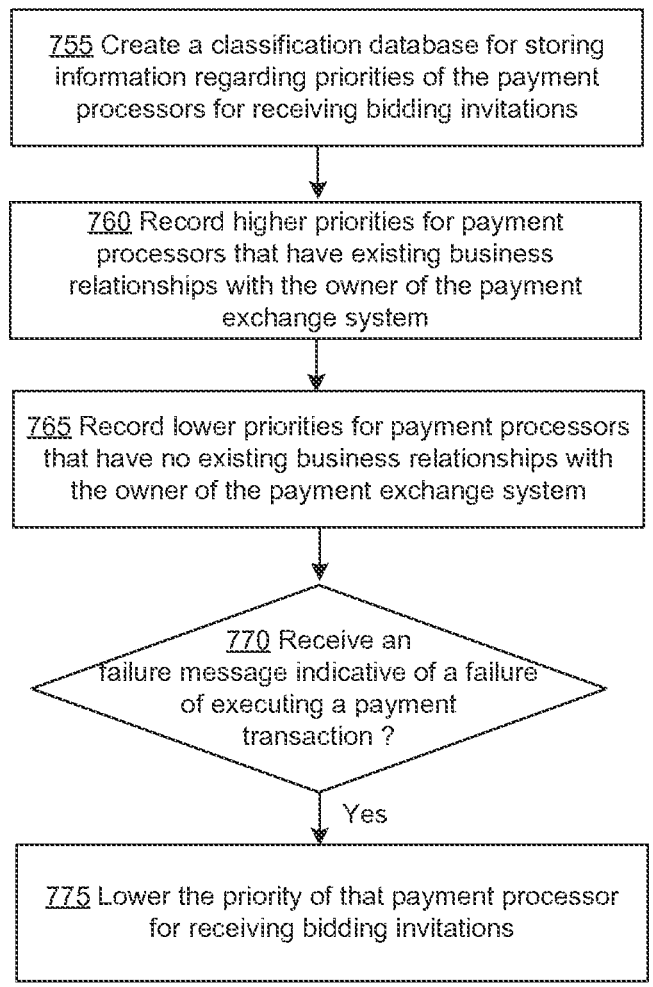
FIG. 7B illustrates an example of an auction priority adjustment process that can be performed by the payment exchange system, according to the second embodiment.

FIG. 7B illustrates an example of an auction priority adjustment process that can be performed by the payment exchange system, according to the second embodiment. The consumer, the merchant or the payment exchange server 604 may set an upper limit for the number of bidding invitations being sent to the payment processors, for reasons such as efficiency or market regulation. When the upper limit is less than the number of available payment processors, payment processors with lower priorities may not get the chances to receive the bidding invitations. Thus, priorities of the payment processors for receiving bidding invitations sometimes dictate whether the payment processors are able to receive the invitations or not.

The process 750 begins when the payment exchange server 604 creates a classification database for storing information regarding priorities of the payment processors for receiving bidding invitations (step 755). The payment exchange server 604 then records higher priorities for payment processors that have existing business relationships with the owner of the payment exchange system (step 760). The payment exchange server 604 further records lower priorities for payment processors that have no existing business relationships with the owner of the payment exchange system (step 765).

If the payment exchange server 604 receives an failure message indicative of a failure of executing a payment transaction by a payment processor (step 770), the payment exchange server 604 lowers the priority of that payment processor for receiving bidding invitations (step 775).

In some other embodiments, the payment exchange server 604 can set up priorities in different ways. For instance, the payment exchange server 604 may set higher priorities for payment processors having larger business. Alternatively, the payment exchange server 604 may set higher priorities for payment processors achieve less processing time for completing the payment transactions.

In some alternative embodiments, a payment exchange system can handle routing of payment transactions in non-bidding situations. For instance, a POS terminal can send a request for completing a payment transaction to the payment exchange system, when the POS terminal reads information of a payment card. Multiple financial institutes can be linked to the payment card via a hardware proxy service or a software proxy server.

The payment exchange system receives the request for completing the payment transaction. In response to the request, the system sends invitations for completing the payment transaction to the financial institutes, and receives proposals for completing the payment transaction from one or more of the financial institutes. A decision module of the system selects a proposal and generates an authorization for a financial institute that proposed the selected proposal to complete the payment transaction.

The proposals can include incentives benefiting various parties. For instance, an incentive can benefit a party of the payment transaction (e.g., the consumer) by offering, e.g., a promotional offer that relates to the payment transaction, an offer of reward points for the payment transaction, or a processing rate offer (meaning less fee charged by the merchant). Alternatively, an incentive can benefit a party operating the payment exchange system by offering, e.g., a processing rate offer, or a processing time quote. An incentive can include a combination of the offers.

The request for completing the payment transaction can include metadata that help the financial institutes in making decisions regarding the proposals. The metadata can include, e.g., a credit profile of a party of the payment transaction; an identification of a party of the payment transaction; information regarding whether a party of the payment transaction is physically present at the location where the request is generated by a POS terminal; information collected by a POS terminal that generates the request; or a combination thereof.

Figure 8:
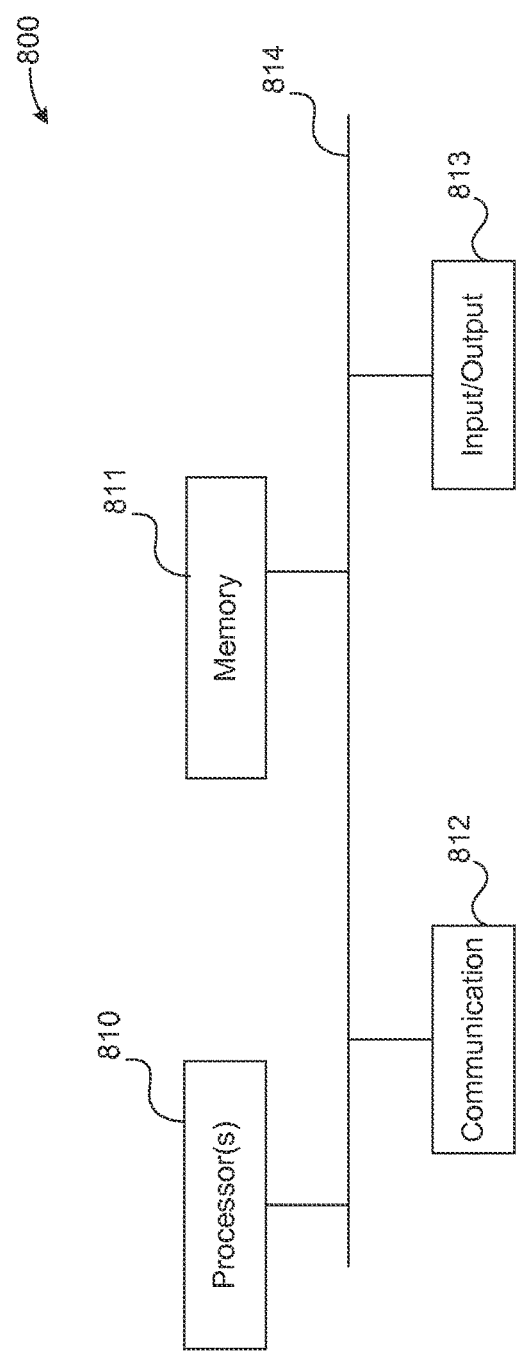
FIG. 8 is a high-level block diagram showing an example of processing system in which at least some operations related to a payment transaction auction can be implemented.

FIG. 8 is a high-level block diagram showing an example of a processing device 800 that can represent any of the devices described above, such as the mobile device 102, POS system 104, payment exchange system 108, payment processor system 114, 116 or 118, computing device 302 or payment exchange server 304. As noted above, any of these systems may include two or more processing devices such as represented in FIG. 8, which may be coupled to each other via a network or multiple networks.

In the illustrated embodiment, the processing system 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, at a payment exchange system, a message indicative that a payment transaction between a consumer and a merchant has been requested, the message being responsive to a read of a payment card of the consumer or a payment authorization from a computing device of the consumer, wherein the payment exchange system serves as an intermediary between the merchant and a set of payment processors;
identifying, based on one or more rules, candidate payment processors from the set of payment processors, wherein the candidate payment processors comprise less than all of the set of payment processors;
sending, from the payment exchange system to the candidate payment processors, bidding invitations for the payment transaction via a computer network, each of the bidding invitations including metadata of the request;
within a time period specified by the payment exchange system, receiving, at the payment exchange system, a first bid from a first payment processor and a second bid from a second payment processor of the candidate payment processors, the first bid including a first proposal for completing the payment transaction and the second bid including a second proposal for completing the payment transaction;
determining, by the payment exchange system, that the first proposal comprises a consumer benefit proposal including an incentive provided to the consumer and from the first payment processor for completing the payment transaction using the first payment processor, wherein the incentive included in the consumer benefit proposal is provided to the consumer independent of an incentive provided to the payment exchange system and the merchant;
selecting the first bid as a winning bid based at least in part on the first proposal including the consumer benefit proposal; and
authorizing the first payment processor that proposed the winning bid to complete the payment transaction.

2. The method of claim 1, further comprising:
receiving an error message indicative of a failure of completing the payment transaction from the first payment processor that proposed the winning bid;
in response to the error message, selecting the second bid as a second winning bid; and
authorizing the second payment processor that proposes the second winning bid to complete the payment transaction.

3. The method of claim 1, wherein the payment card is associated with a plurality of payment accounts of the consumer.

4. The method of claim 1, wherein the payment authorization is generated from a metacard or a virtual wallet that links to a plurality of payment accounts of the consumer.

5. The method of claim 1, wherein each of the bidding invitations includes metadata of the request and is indicative that additional metadata of the payment transaction will be available to the payment processor that proposed the winning bid.

6. The method of claim 1, wherein the incentive for the consumer is provided from the first payment processor directly to the consumer.

7. The method of claim 1, wherein the incentive for the consumer comprises at least one of frequent flier miles, loyalty program points, or a coupon.

8. The method of claim 1, wherein the first proposal further comprises an additional proposal including an additional incentive provided, from the first payment processor, to at least one of the payment exchange system or the merchant.

9. The method of claim 1, wherein the incentive included in the consumer benefit proposal includes a credit for an account of the consumer registered with the first payment processor.

10. A method comprising:
receiving, at one or more servers of a payment exchange system, a request for the payment exchange system to complete a payment transaction between a consumer and a merchant, wherein the request includes metadata associated with the consumer, and the payment exchange system serves as an intermediary between the merchant and a set of payment processing servers;
identifying, based at least in part on the metadata, a plurality of payment accounts associated with the consumer;
identifying, from the set of payment processing servers, candidate payment processing servers capable of performing payment transactions using at least one of the plurality of payment accounts associated with the consumer, wherein the candidate payment processing servers comprise less than all of the set of payment processing servers;
transmitting, from the one or more servers to the candidate payment processing servers, bidding invitations for bids for the right to complete the payment transaction;
identifying a payment account, from the plurality of payment accounts, that is associated with an operator of the payment exchange system;
generating, by the one or more servers, a payment exchange system bid for completing the payment transaction on behalf of the operator of the payment exchange system;
receiving bids from the candidate payment processing servers;
selecting a winning bid from among a plurality of bids based on a benefit of each bid to a party involved in the payment transaction, wherein the plurality of bids includes:
the bids from the candidate payment processing servers; and
the payment exchange system bid; and
prompting an individual payment processing server that proposed the winning bid to complete the payment transaction.

11. The method of claim 10, wherein the metadata included in the request comprise one or more of: a consumer identity, a merchant identity, a transaction identification, payment card information, purchasing item information, price, expiration time, currency, geographic location of the consumer, geographic location of the merchant, a consumer transaction history, or a risk estimation of the payment transaction.

12. The method of claim 10, further comprising:
   determining a commission fee, at the one or more servers, by deducting the commission fee from a processing fee for completing the payment transaction proposed by the winning bid.

13. The method of claim 10, wherein the set of payment processing servers are endpoint systems associated with one or more of: payment processing platforms, credit card companies, banks, or loan companies.

14. The method of claim 10, wherein the winning bid proposes completing the payment transaction by transferring a fund from a payment account of the plurality of payment accounts associated with the consumer to a receiving account of the merchant, both the payment account and the receiving account being associated with an entity that operates an individual payment processing server that proposed the winning bid.

15. The method of claim 10, further comprising:
   determining whether the payment transaction satisfies a criterion set by a particular payment processing server of the set of payment processing servers; and
   in response to determining that the payment transaction satisfies the criterion, transmitting a bidding invitation for the payment transaction to the particular payment processing server.

16. The method of claim 10, wherein the one or more servers transmit bidding invitations of a plurality of auctions for completing payment transactions in concurrent real-time data streams to the candidate payment processing servers.

17. The method of claim 10, wherein the plurality of bids are received within a time period after the bidding invitations have been transmitted, the time period being specified by a request for completing the payment transaction.

18. A payment exchange system comprising:
   a processing unit;
   one or more computer-readable media comprising computer-executable instructions that, when executed by the processing unit, cause the processing unit to perform acts comprising:
      receiving, by a network interface of the payment exchange system, a request for completing a payment transaction between a consumer and a merchant, wherein the payment exchange system server as an intermediary between the merchant and a set of financial institutes;
      identifying, from a plurality of payment methods associated with the consumer, a preferred payment method of the consumer, wherein identifying the preferred payment method of the consumer comprises:
         determining, based at least in part on a history of purchase transactions of the consumer, that the preferred payment method is used more often than other payment methods of the plurality of payment methods;
      identifying, from the set of financial institutes, candidate financial institutes capable of performing the payment transaction using the preferred payment method, wherein the candidate financial institutes comprises less than all of the set of financial institutes;
      sending, by the network interface, invitations for completing the payment transaction to the candidate financial institutes based at least in part on receiving the request;
      receiving, by the network interface, proposals for completing the payment transaction from one or more of the candidate financial institutes;
      selecting a proposal of the proposals, the proposal proposed by a candidate financial institute of the candidate financial institutes; and
      generating an authorization for the candidate financial institute, that proposed the proposal, to complete the payment transaction.

19. The payment exchange system of claim 18, wherein at least one proposal of the proposals includes an incentive benefiting a party of the payment transaction, or a party operating the payment exchange system.

20. The payment exchange system of claim 19, wherein the incentive includes:
   a processing rate offer;
   a processing time quote;
   a promotional offer that relates to the payment transaction;
   an offer of reward points for the payment transaction; or
   a combination thereof.

21. The payment exchange system of claim 18, wherein the request for completing the payment transaction is sent by a POS terminal when the POS terminal reads information of a payment card.

22. The payment exchange system of claim 21, wherein the candidate financial institutes are linked to the payment card via a hardware proxy service or a software proxy server.

23. The payment exchange system of claim 18, wherein the request for completing the payment transaction includes metadata that help the candidate financial institutes in making decisions regarding the proposals, and wherein the metadata include:
   a credit profile of a party of the payment transaction;
   an identification of a party of the payment transaction;
   information regarding whether a party of the payment transaction is physically present at a location where the request is generated;
   information collected by a POS terminal that generates the request; or
   a combination thereof.

24. The payment exchange system of claim 18, wherein:
   the invitations are bidding invitations of an auction for completing the payment transaction;
   the proposals are bids for the auction including processing fee quotes; and
   selecting the winning proposal comprises selecting a winning bid which proposes a least amount of processing fee among the bids.

25. The payment exchange system of claim 24, further comprising:
   a classification database for storing priorities of the set of financial institutes for receiving bidding invitations.

26. The payment exchange system of claim 25, wherein in the classification database, a first plurality of financial institutes, of the set of financial institutes, that have existing business relationships with an operator of the payment exchange system are assigned higher priorities for receiving bidding invitations than a second plurality of financial institutes, of the set of financial institutes, that have no business relationship with the operator of the payment exchange system.

27. The payment exchange system of claim 25, the acts further comprising, in response to receiving an error message indicative that the candidate financial institute of the winning bid fails to complete the payment transaction, lowering the priority of the candidate financial institute for receiving bidding invitations.

28. The payment exchange system of claim 24, the acts further comprising:
- receiving, by the network interface, criteria of payment transactions that a financial institute is capable of completing; and
- determining whether to send bid invitations of payment transactions to the financial institute depending on whether the payment transactions fit the criteria.

29. The payment exchange system of claim 24, wherein the request includes metadata indicative of a type of high-risk payment transaction; and
the networking interface is configured to send a bidding invitation to a financial institute that specializes in completing the type of high-risk payment transaction.

30. The payment exchange system of claim 18, wherein identifying the candidate financial institutions capable of performing the payment transaction comprises:
- searching a database storing indications of the set of financial institutions and information associated with each financial institution of the set of financial institutions; and
- identifying, based at least in part on the information and from the set of financial institutions, the candidate financial institutions as being capable of performing the payment transaction using the preferred payment method.

* * * * *